Patented Aug. 26, 1930

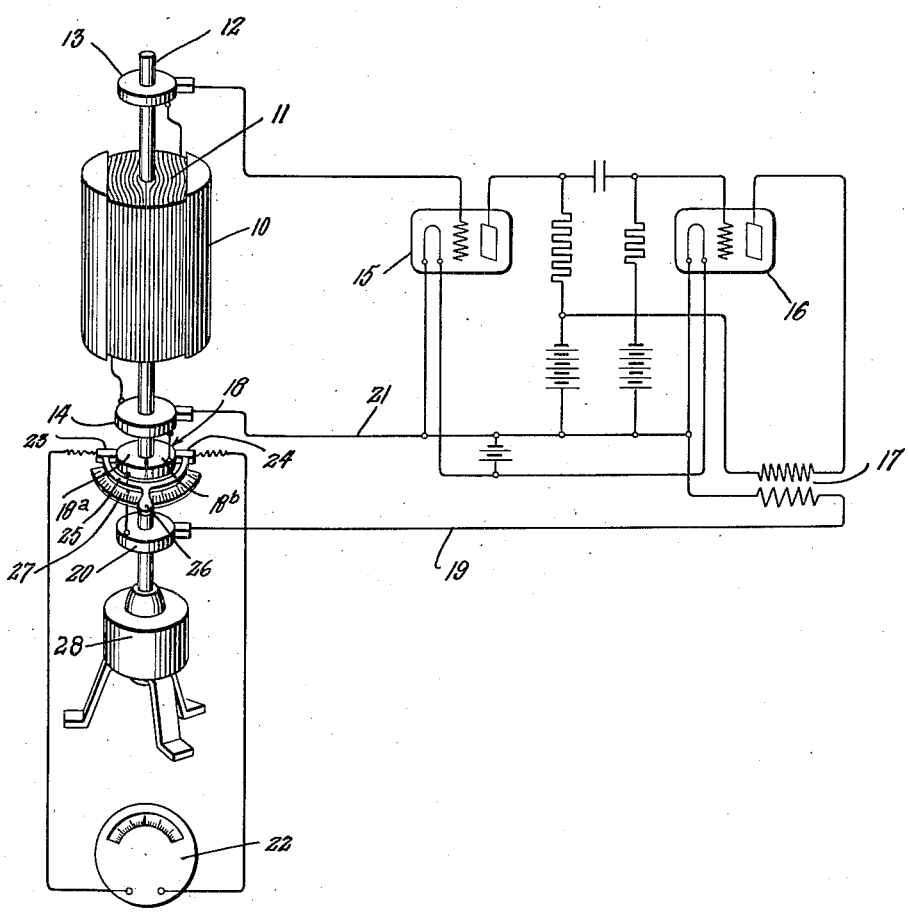

1,774,459

UNITED STATES PATENT OFFICE

JAMES D. TEAR, OF SCHENECTADY, NEW YORK, ASSIGNOR TO GENERAL ELECTRIC COMPANY, A CORPORATION OF NEW YORK

COMPASS

Application filed September 22, 1927. Serial No. 221,326.

My invention relates to compasses, more particularly to electromagnetic compasses of the earth inductor type, and has for its object the provision of an accurate and reliable device of this character.

More specifically my invention relates to compasses of the earth inductor type in which an electrical direction indicating instrument is operated by means of electromotive forces induced by the earth's field in a rapidly rotating winding. Ordinarily a commutator is provided for rectifying the alternating electromotive forces induced in the winding and the indicating instrument consists of a direct current voltmeter connected to the commutator. In one of its aspects my invention relates to means for amplifying the electromotive forces induced in the inductor winding whereby the size and weight of the apparatus may be reduced and greater accuracy and reliability obtained.

In carrying out my invention I provide power amplifying means which is responsive to the alternating electromotive forces induced in the earth inductor winding, and has its output circuit connected to a commutator to which a direct current indicating instrument is connected.

For a more complete understanding of my invention reference should be had to the accompanying drawing the single figure of which is a diagrammatic representation of a compass embodying my invention.

Referring to the drawing, my invention in one form comprises an armature member 10 preferably made from an electrically insulating material, such as a phenolic condensation product, wood, etc. On this member is an earth inductor winding 11 which consists of a large number of turns of fine wire. The armature is mounted on a shaft 12 which is suitably supported so as to rotate about a vertical axis. The armature, for example, may be mounted in suitable gimbal supports, not shown, whereby the axis of the shaft 12 is maintained vertical regardless of the variations in position of the ship or airplane on which it is mounted.

The terminals of the winding 11 are connected to slip rings 13 and 14 secured to the shaft 12 in insulated relation therewith. Cooperating with the slip rings are suitable brushes and these brushes are electrically connected to the input circuit of a suitable electrical power amplifying device which, as shown, comprises a two-stage electron discharge device amplifier comprising electron discharge devices 15 and 16. The terminals of the winding 11 are connected through the slip rings, brushes and connections, previously referred to, to the grid or input circuit of the discharge device 15, the output circuit of which is in turn connected to the input circuit of the discharge device 16 and the output circuit of the latter discharge device is in turn connected through a suitable transformer 17 to a two-segment commutator 18 mounted on the shaft 12. As shown, one terminal of the transformer 17 is connected through a conductor 19 and a suitable brush to a slip ring 20 secured to the shaft 12 in insulated relation therewith, this slip ring being electrically connected to one of the segments 18$^a$ of the commutator. The opposite terminal of the transformer 17 is connected to the segment 18$^b$ of the commutator and in making this connection the conductor 21 and the slip ring 14, forming a part of the input connections to the amplifier, are utilized. An electrical connection is provided between the slip ring 14 and the commutator segment 18$^b$.

An electrical indicating instrument 22, preferably a direct current voltmeter, is electrically connected to the commutator 18 by means of brushes 23 and 24 which bear on the commutator at diametrically opposite points, whereby a direct current electromotive force is supplied to the voltmeter. Preferably an adjustable support is provided for the brushes 23 and 24 whereby the brushes may be adjusted about the axis of the shaft 12, for example, a member 25 to which the brushes are secured in insulating relation therewith, this member being adjustable about the axis of shaft 12 by means of a handle 26. A suitable fixed scale 27 is provided cooperating with the member 25 whereby predetermined adjustment may be made to give a predetermined setting of the voltmeter 22. It will be observed that when the brushes 23 and 24 are adjusted at such an angle that they lie on a line parallel with the horizontal component of the earth's field, the voltage across the brushes will be zero. Preferably, the index hand of the voltmeter will be biased by a spring to a central position on its scale, as shown in the drawing, so that for a zero voltage condition the index hand will be moved to the central position by the spring.

In using the device the brushes 23 and 24 will be adjusted so as to give a predetermined reading of the voltmeter when the ship or airplane has been headed in the desired direction. This position of the voltmeter will preferably be the central or zero position and by suitably calibrating the scale 27 the brushes may be set so that when the voltmeter comes to a zero position the operator will know that he is headed in the desired direction. Any subsequent deviation from this direction produces a deflection of the voltmeter corresponding with the direction of the deviation and the operator steers the ship so as to maintain the voltmeter on zero.

The armature 10 is rotated at high speed in a suitable manner, for example, by means of an electric motor 28. It may also be driven by means of a wind propeller. With the amplifier the highest accuracy is assurred since it makes unnecessary the use of a paramagnetic core, which is sometimes used to obtain increased electromotive force, and which introduces errors due to hysteresis.

Because of the extremely small current taken by the input circuit of the amplifier, the slip rings and brushes can be chosen mainly for greatest reliability without particular reference to the electrical contact resistance, and the winding can be chosen with reference to lightness and mechanical strength. For example, the winding may be wound from a conductor made of an alloy, such as an alloy containing aluminum, having a comparatively high resistance but having desirable mechanical properties, such as light weight. The resulting reduction in size and moment of inertia of the armature has the further advantage of practically eliminating gyroscopic effect. Furthermore, the amplifier has a comparatively high power output and therefore the commutator and brushes can be chosen without special consideration of contact resistance. By reason of this a rugged and reliable indicating instrument can be used.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:—

1. Means for indicating the direction of an axis of a body with relation to a component of a magnetic field comprising an armature provided with a winding and a commutator, means for rotating said armature in said field about an axis at right angles to said component, an electrical amplifying device connected between said winding and said commutator, brushes bearing on said commutator, and means including an electrical indicating instrument connected to said brushes for indicating the direction of the axis of said body with respect to said component.

2. Means for indicating direction of an axis of a body with relation to a component of a magnetic field comprising a winding, means for rotating said winding in said field about an axis at right angles to said component, an electron discharge amplifying device provided with input and output circuits, electrical connections between the input circuit of said amplifying device and said winding, a commutator driven with said winding, electrical connections between the output circuit of said amplifying device and said commutator, brushes on said commutator, and means including an electrical indicating instrument connected to said brushes for indicating the direction of the axis of said body with respect to said component.

3. An earth inductor compass comprising a winding, means for rotating said winding about an axis at right angles to the horizontal component of the earth's magnetic field whereby alternating electromotive forces are induced in said winding, electrical amplifying means having its input circuit connected to said winding, a commutator rotated with said winding, electrical connections including brushes between the output circuit of said amplifying means and said commutator, and an electrical indicating instrument connected to said commutator for indicating the electrical polarity at said brushes.

4. An earth inductor compass comprising a shaft mounted for rotation about a vertical axis, a winding on said shaft, a commutator on said shaft, means for rotating said shaft about an axis at right angles with the horizontal component of the earth's field whereby electromotive forces are induced in said winding, an electrical amplifying device connected between said winding and said commutator, brushes for said commutator, and means including an electrical indicating instrument connected to said brushes and a support for said brushes adjustable about the axis of said shaft to vary the reading of said instrument for indicating the direction of an axis of said support with respect to the horizontal component of said field.

5. An earth inductor compass comprising a shaft mounted for rotation about a vertical axis, a commutator on said shaft, means for rotating said shaft about the axis at right angles with the horizontal component of the earth's field whereby electromotive forces are induced in said winding, an electron discharge amplifying device provided with input and output circuits, electrical connections between the input circuit of said amplifying device and said winding, electrical connections between the output circuit of said amplifying device and said commutator, brushes for said commutator, and means including an electrical indicating instrument connected to said brushes and a support for said brushes adjustable about the axis of said shaft to vary the reading of said instrument for indicating the angular direction of an axis of said support with respect to the horizontal component of the earth's field.

In witness whereof, I have hereunto set my hand this 21st day of September 1927.

JAMES D. TEAR.